US007427440B2

(12) United States Patent
Wu et al.

(10) Patent No.: US 7,427,440 B2
(45) **Date of Patent: *Sep. 23, 2008**

(54) PHOTORECEPTOR LAYER HAVING POLYETHER LUBRICANTS

(75) Inventors: Jin Wu, Webster, NY (US); Geoffrey M T. Foley, Fairport, NY (US); Liang-Bih Lin, Rochester, NY (US); Edward C. Savage, Webster, NY (US); Robert P. Altavela, Webster, NY (US); Marc J. Livecchi, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 467 days.

This patent is subject to a terminal disclaimer.

(21) Appl. No.: 11/193,672

(22) Filed: Jul. 28, 2005

(65) Prior Publication Data

US 2007/0026233 A1 Feb. 1, 2007

(51) Int. Cl.
*B32B 27/18* (2006.01)
*G03G 15/04* (2006.01)

(52) U.S. Cl. .................... 428/411.1; 428/412; 428/419; 430/58.6; 430/66; 430/67

(58) Field of Classification Search .............. 428/411.1, 428/412, 413, 419, 423.1, 447, 474.4, 480, 428/500, 522, 523, 532; 430/58.06, 66, 67
See application file for complete search history.

(56) References Cited

U.S. PATENT DOCUMENTS

| | | | | |
|---|---|---|---|---|
| 3,198,734 | A * | 8/1965 | Morway | 508/532 |
| 4,889,784 | A * | 12/1989 | Champ et al. | 430/58.45 |
| 5,272,029 | A * | 12/1993 | Sakai et al. | 430/59.6 |
| 2003/0073015 | A1* | 4/2003 | Tamoto et al. | 430/66 |

* cited by examiner

*Primary Examiner*—Ramsey Zacharia
(74) *Attorney, Agent, or Firm*—Annette L. Bade

(57) ABSTRACT

An imaging member containing a substrate, and an outer layer containing a polyether lubricant, and an image forming apparatus for forming images on a recording medium including the imaging member above, a development component to apply a developer material to said charge-retentive surface to develop said electrostatic latent image to form a developed image on said charge-retentive surface; a transfer component for transferring said developed image from said charge-retentive surface to another member or a copy substrate; and a fusing member to fuse said developed image to said copy substrate.

14 Claims, 2 Drawing Sheets

PHOTORECEPTOR LAYER HAVING POLYETHER LUBRICANTS

CROSS REFERENCE TO RELATED APPLICATIONS

Reference is made to co-pending, commonly assigned U.S. patent application Ser. No. 11/126,664, filed May 11, 2005, entitled, "Photoconductive Members;" U.S. patent application Ser. No. 11/193,242, filed Jul. 28, 2005, entitled, "Polytetrafluoroethylene-doped Photoreceptor Layer having Polyol Ester Lubricants;" U.S. patent application Ser. No. 11/193,541, filed Jul. 28, 2005, entitled, "Photoreceptor Layer having Solid and Liquid Lubricants;" U.S. patent application Ser. No. 11/193,241, filed Jul. 28, 2005, entitled, "Photoreceptor Layer having Dialkyldithiophosphhate Additives;" U.S. patent application Ser. No. 11/193,129, filed Jul. 28, 2005, entitled, "Photoreceptor Layer having Phosphorus-based Additives;" and U.S. patent application Ser. No. 11/193,754, filed Jul. 28, 2005, entitled, "Photoreceptor Layer having Antioxidant Lubricant Additives;" The disclosures of these applications are hereby incorporated by reference in their entirety.

BACKGROUND

This disclosure is generally directed to imaging members, photoreceptors, photoconductors, and the like. More specifically, the present disclosure is directed to a multi-layered photoreceptor with a substrate, an outer layer such as a charge transport layer (CTL) or overcoat layer (OCL), an optional hole blocking, and/or optional undercoat layer (UCL), and wherein at least one layer comprises polyether lubricant. The polyether lubricant can be a polyphenyl ether, a polyphenyl thioether, a C-ether, or the like, or mixtures thereof. The photoreceptors herein, in embodiments extended life, and excellent wear resistant characteristics. In addition, in embodiments, the present photoreceptors have improved toner cleanability.

Use of the polyether lubricant has shown up to a 30 percent improvement in wear resistance when compared to a CTL without the polyether lubricant. The use of polyether lubricant has been shown to exhibit little or no detrimental effects to electrical and cyclic properties at all zones. In fact, the use of polyether lubricant has shown, in embodiments, excellent cycling and environmental stability. The polyether lubricants can function well in many of the layers of the photoreceptor, such as the charge transport layer, overcoat layer, or other layer.

SUMMARY

Embodiments include an imaging member comprising a substrate; and thereover an outer layer comprising a polyether lubricant.

Also, embodiments include an imaging member comprising a substrate; and thereover a charge transport layer comprising a polyether lubricant.

In addition, embodiments also include an image forming apparatus for forming images on a recording medium comprising a) an imaging member comprising a substrate; and thereover an outer layer comprising a polyether lubricant; b) a development component to apply a developer material to said charge-retentive surface to develop said electrostatic latent image to form a developed image on said charge-retentive surface; c) a transfer component for transferring said developed image from said charge-retentive surface to another member or a copy substrate; and d) a fusing member to fuse said developed image to said copy substrate.

BRIEF DESCRIPTION OF THE DRAWINGS

For a better understanding, reference may be had to the accompanying figures.

DETAILED DESCRIPTION

Figure 1:
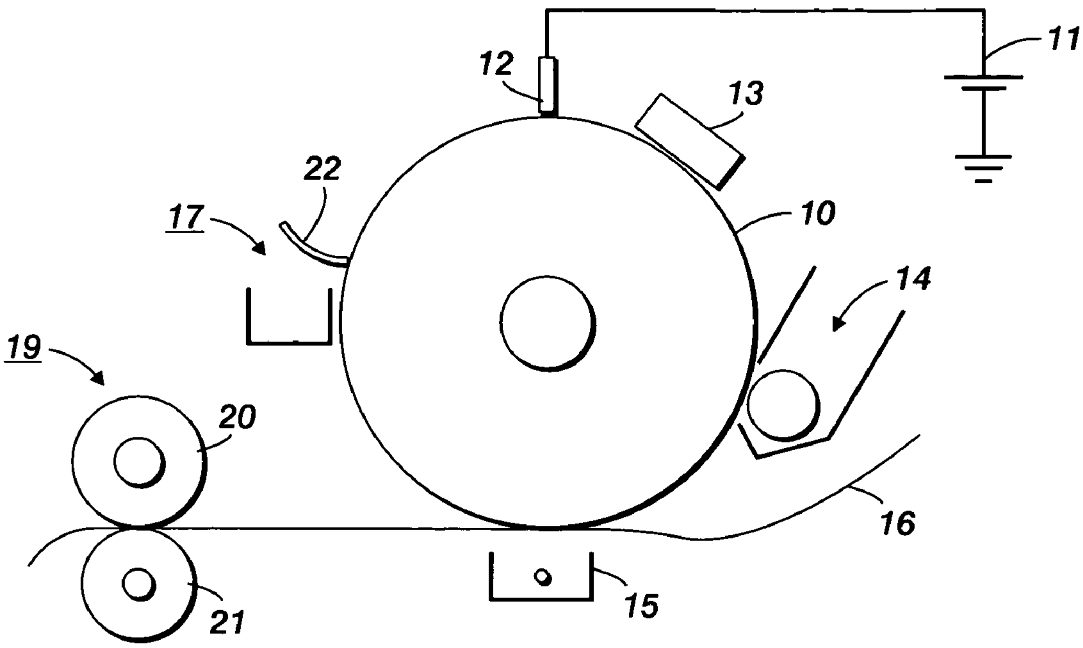
FIG. 1 is an illustration of a general electrostatographic apparatus using a photoreceptor member.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles, which are commonly referred to as toner. Specifically, photoreceptor 10 is charged on its surface by means of an electrical charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface, in image configuration, they are transferred to a copy sheet 16 by transfer means 15, which can be pressure transfer or electrostatic transfer. In embodiments, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Fusing may be accomplished by other fusing members such as a fusing belt in pressure contact with a pressure roller, fusing roller in contact with a pressure belt, or other like systems. Photoreceptor 10, subsequent to transfer, advances to cleaning station 17, wherein any toner left on photoreceptor 10 is cleaned there from by use of a blade 22 (as shown in FIG. 1), brush, or other cleaning apparatus.

Figure 2:
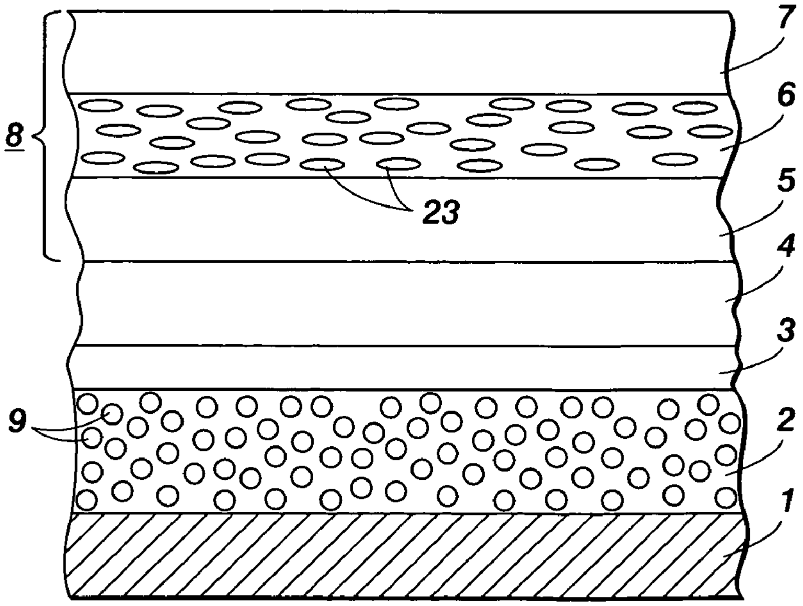
FIG. 2 is an illustration of an embodiment of a photoreceptor showing various layers and embodiments of filler dispersion.
Figure 3:
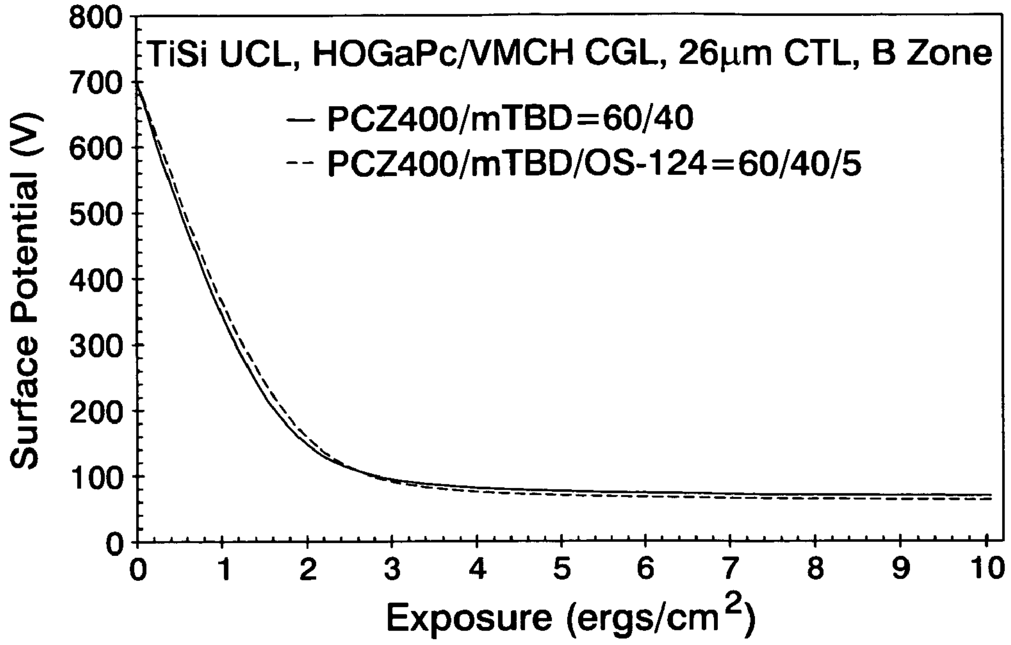
FIG. 3 is a graph showing surface potential versus exposure by use of an embodiment of a photoreceptor illustrated herein including polyphenyl ether lubricant.
Figure 4:
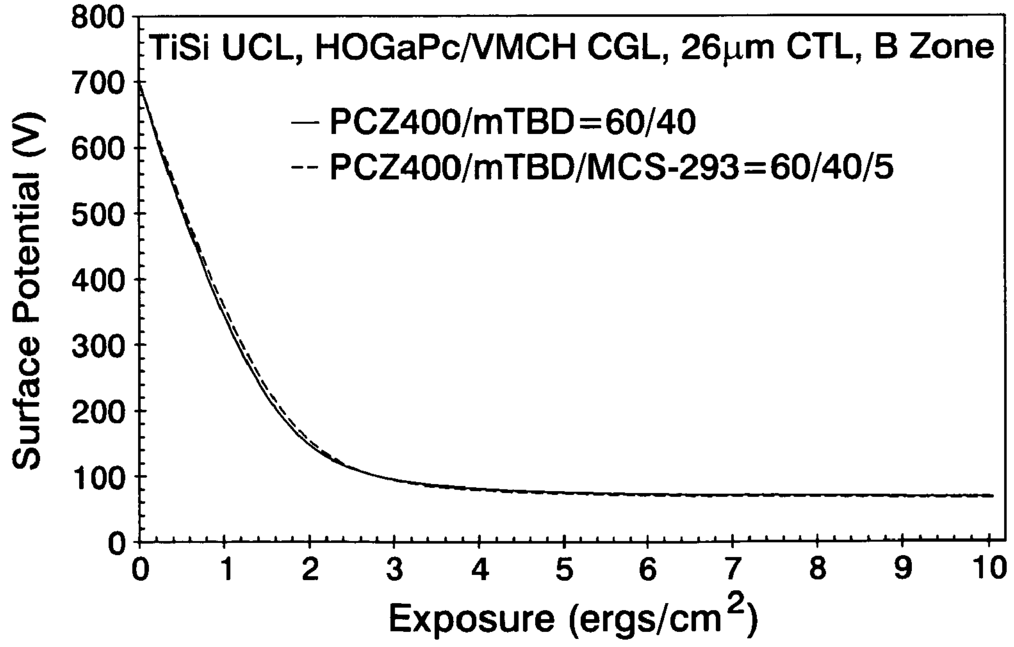
FIG. 4 is a graph showing surface potential versus exposure by use of an embodiment of a photoreceptor illustrated herein including polyphenyl thioether lubricant.

Electrophotographic imaging members are well known in the art. Electrophotographic imaging members may be prepared by any suitable technique. Referring to FIG. 2, typically, a flexible or rigid substrate 1 is provided with an electrically conductive surface or coating 2.

The substrate may be opaque or substantially transparent and may comprise any suitable material having the required mechanical properties. Accordingly, the substrate may comprise a layer of an electrically non-conductive or conductive material such as an inorganic or an organic composition. As electrically non-conducting materials, there may be employed various resins known for this purpose including polyesters, polycarbonates, polyamides, polyurethanes, and the like which are flexible as thin webs. An electrically conducting substrate may be any metal, for example, aluminum, nickel, steel, copper, and the like or a polymeric material, as described above, filled with an electrically conducting substance, such as carbon, metallic powder, and the like or an organic electrically conducting material. The electrically insulating or conductive substrate may be in the form of an endless flexible belt, a web, a rigid cylinder, a sheet and the like. The thickness of the substrate layer depends on numerous factors, including strength desired and economical considerations. Thus, for a drum, this layer may be of substantial thickness of, for example, up to many centimeters or of a minimum thickness of less than a millimeter. Similarly, a flexible belt may be of substantial thickness, for example, about 250 micrometers, or of minimum thickness less than 50 micrometers, provided there are no adverse effects on the final electrophotographic device.

In embodiments where the substrate layer is not conductive, the surface thereof may be rendered electrically conductive by an electrically conductive coating 2, which may comprise electrically conductive materials 9 dispersed or contained therein. The conductive coating may vary in thickness over substantially wide ranges depending upon the optical transparency, degree of flexibility desired, and economic factors. In embodiments, coating 2 is an electron transport layer discussed in detail below.

An optional hole-blocking layer 3 may be applied to the substrate 1 or coatings. Any suitable and conventional blocking layer capable of forming an electronic barrier to holes between the adjacent photoconductive layer 8 (or electrophotographic imaging layer 8) and the underlying conductive surface 2 of substrate 1 may be used. In embodiments, layer 3 is an interfacial layer discussed in detail below.

An optional adhesive layer 4 may be applied to the hole-blocking layer 3. Any suitable adhesive layer well known in the art may be used. Typical adhesive layer materials include, for example, polyesters, polyurethanes, and the like. Satisfactory results may be achieved with adhesive layer thickness between about 0.05 micrometer (500 angstroms) and about 0.3 micrometer (3,000 angstroms). Conventional techniques for applying an adhesive layer coating mixture to the hole blocking layer include spraying, dip coating, roll coating, wire wound rod coating, gravure coating, Bird applicator coating, and the like. Drying of the deposited coating may be effected by any suitable conventional technique such as oven drying, infrared radiation drying, air-drying and the like.

At least one electrophotographic-imaging layer 8 is formed on the adhesive layer 4 blocking layer or interfacial layer 3 or substrate 1. The electrophotographic imaging layer 8 may be a single layer (7 in FIG. 2) that performs both charge-generating generating and charge transport functions as is well known in the art, or it may comprise multiple layers such as a charge generator layer 5 and charge transport layer 6 and overcoat 7.

The charge-generating layer 5 can be applied to the electrically conductive surface, or on other surfaces in between the substrate 1 and charge-generating layer 5. A charge-blocking layer or hole-blocking layer 3 may optionally be applied to the electrically conductive surface prior to the application of a charge-generating layer 5. If desired, an adhesive layer 4 may be used between the charge blocking or hole-blocking layer or interfacial layer 3 and the charge-generating layer 5. Usually, the charge generation layer 5 is applied onto the blocking layer 3 and a charge transport layer 6, is formed on the charge generation layer 5. This structure may have the charge generation layer 5 on top of or below the charge transport layer 6.

Charge generator layers may comprise amorphous films of selenium and alloys of selenium and arsenic, tellurium, germanium and the like, hydrogenated amorphous silicon and compounds of silicon and germanium, carbon, oxygen, nitrogen and the like fabricated by vacuum evaporation or deposition. The charge-generator layers may also comprise inorganic pigments of crystalline selenium and its alloys; Group II-VI compounds; and organic pigments such as quinacridones, polycyclic pigments such as dibromo anthanthrone pigments, perylene and perinone diamines, polynuclear aromatic quinones, azo pigments including bis-, tris- and tetrakis-azos; and the like dispersed in a film forming polymeric binder and fabricated by solvent coating techniques.

Phthalocyanines have been employed as photogenerating materials for use in laser printers using infrared exposure systems. Infrared sensitivity is required for photoreceptors exposed to low-cost semiconductor laser diode light exposure devices. The absorption spectrum and photosensitivity of the phthalocyanines depend on the central metal atom of the compound. Many metal phthalocyanines have been reported and include, oxyvanadium phthalocyanine, chloroaluminum phthalocyanine, copper phthalocyanine, oxytitanium phthalocyanine, chlorogallium phthalocyanine, hydroxygallium phthalocyanine magnesium phthalocyanine and metal-free phthalocyanine. The phthalocyanines exist in many crystal forms, and have a strong influence on photogeneration.

Any suitable polymeric film forming binder material may be employed as the matrix in the charge-generating (photogenerating) binder layer. Typical polymeric film forming materials include those described, for example, in U.S. Pat. No. 3,121,006, the entire disclosure of which is incorporated herein by reference. Thus, typical organic polymeric film forming binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, poly (phenylene sulfides), poly (vinyl acetate), polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, poly (vinyl chloride), vinyl chloride and vinyl acetate copolymers, acrylate copolymers, alkyd resins, cellulosic film formers, poly(amideimide), styrenebutadiene copolymers, vinylidene chloride-vinyl chloride copolymers, vinyl acetate-vinylidene chloride copolymers, styrene-alkyd resins, poly (vinyl carbazole), and the like. These polymers may be block, random or alternating copolymers.

The photogenerating composition or pigment is present in the resinous binder composition in various amounts. Generally, however, from about 5 percent by volume to about 90 percent by volume of the photogenerating pigment is dispersed in about 10 percent by volume to about 95 percent by volume of the resinous binder, or from about 20 percent by volume to about 30 percent by volume of the photogenerating pigment is dispersed in about 70 percent by volume to about 80 percent by volume of the resinous binder composition. In one embodiment, about 8 percent by volume of the photogenerating pigment is dispersed in about 92 percent by volume of the resinous binder composition. The photogenerator layers can also fabricated by vacuum sublimation in which case there is no binder.

Any suitable and conventional technique may be used to mix and thereafter apply the photogenerating layer coating mixture. Typical application techniques include spraying, dip coating, roll coating, wire wound rod coating, vacuum sublimation and the like. For some applications, the generator layer may be fabricated in a dot or line pattern. Removing of the solvent of a solvent-coated layer may be effected by any suitable conventional technique such as oven drying, infrared radiation drying, air-drying and the like.

The charge transport layer 6 may comprise a charge transporting small molecule 23 dissolved or molecularly dispersed in a film forming electrically inert polymer such as a polycarbonate. The term "dissolved" as employed herein is defined herein as forming a solution in which the small molecule is dissolved in the polymer to form a homogeneous phase. The expression "molecularly dispersed" is used herein is defined as a charge transporting small molecule dispersed in the polymer, the small molecules being dispersed in the polymer on a molecular scale. Any suitable charge transporting or electrically active small molecule may be employed in the charge transport layer of this invention. The expression charge transporting "small molecule" is defined herein as a monomer that allows the free charge photogenerated in the transport layer to be transported across the transport layer. Typical charge transporting small molecules include, for example, pyrazolines such as 1-phenyl-3-(4'-diethylamino styryl)-5-(4"-diethylamino phenyl)pyrazoline, diamines such as N,N'-diphenyl-N,N'-bis(3-methylphenyl)-(1,1'-biphenyl)-4,4'-diamine, hydrazones such as N-phenyl-N-methyl-3-(9-ethyl)carbazyl hydrazone and 4-diethyl amino benzaldehyde-1,2-diphenyl hydrazone, and oxadiazoles such as 2,5-bis (4-N,N'-diethylaminophenyl)-1,2,4-oxadiazole, stilbenes and the like. However, to avoid cycle-up in machines with high throughput, the charge transport layer should be substantially free (less than about two percent) of di or triamino-triphenyl methane. As indicated above, suitable electrically active small molecule charge transporting compounds are dissolved or molecularly dispersed in electrically inactive polymeric film forming materials. A small molecule charge transporting compound that permits injection of holes from the pigment into the charge generating layer with high efficiency and transports them across the charge transport layer with very short transit times is N,N'-diphenyl-N,N'-bis(3-methylphenyl)-(1,1'-biphenyl)-4,4'-diamine. If desired, the charge transport material in the charge transport layer may comprise a polymeric charge transport material or a combination of a small molecule charge transport material and a polymeric charge transport material.

Any suitable electrically inactive resin binder insoluble in the alcohol solvent used to apply the overcoat layer 7 may be employed in the charge transport layer of this invention. Typical inactive resin binders include polycarbonate resin, polyester, polyarylate, polyacrylate, polyether, polysulfone, and the like. Molecular weights can vary, for example, from about 20,000 to about 150,000. Examples of binders include polycarbonates such as poly(4,4'-isopropylidene-diphenylene) carbonate (also referred to as bisphenol-A-polycarbonate, poly(4,4'-cyclohexylidinediphenylene) carbonate (referred to as bisphenol-Z polycarbonate), poly(4,4'-isopropylidene-3,3'-dimethyl-diphenyl)carbonate (also referred to as bisphenol-C-polycarbonate) and the like. Any suitable charge-transporting polymer may also be used in the charge-transporting layer of this invention. The charge-transporting polymer should be insoluble in the alcohol solvent employed to apply the overcoat layer of this invention. These electrically active charge transporting polymeric materials should be capable of supporting the injection of photogenerated holes from the charge generation material and be capable of allowing the transport of these holes there through.

Any suitable and conventional technique may be used to mix and thereafter apply the charge transport layer coating mixture to the charge-generating layer. Typical application techniques include spraying, dip coating, roll coating, wire wound rod coating, and the like. Drying of the deposited coating may be effected by any suitable conventional technique such as oven drying, infrared radiation drying, air-drying and the like.

Generally, the thickness of the charge transport layer is between about 10 and about 50 micrometers, but thicknesses outside this range can also be used. The hole transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layers can be maintained from about 2:1 to 200:1 and in some instances as great as 400:1. The charge transport layer, is substantially non-absorbing to visible light or radiation in the region of intended use but is electrically "active" in that it allows the injection of photogenerated holes from the photoconductive layer, i.e., charge generation layer, and allows these holes to be transported through itself to selectively discharge a surface charge on the surface of the active layer.

The thickness of the continuous optional overcoat layer selected depends upon the abrasiveness of the charging (e.g., bias charging roll), cleaning (e.g., blade or web), development (e.g., brush), transfer (e.g., bias transfer roll), etc., in the system employed and can range up to about 10 micrometers. In embodiments, the thickness is from about 1 micrometer and about 5 micrometers. Any suitable and conventional technique may be used to mix and thereafter apply the overcoat layer coating mixture to the charge-generating layer. Typical application techniques include spraying, dip coating, roll coating, wire wound rod coating, and the like. Drying of the deposited coating may be effected by any suitable conventional technique such as oven drying, infrared radiation drying, air-drying, and the like. The dried overcoating of this invention should transport holes during imaging and should not have too high a free carrier concentration. Free carrier concentration in the overcoat increases the dark decay. In embodiments, the dark decay of the overcoated layer should be about the same as that of the unovercoated device.

The overcoat layer can comprise same ingredients as charge transport layer, wherein the weight ratio between the charge transporting small molecule and the suitable electrically inactive resin binder and is smaller, and it could be as small as 0. The overcoat layer can comprise lubricants for extra wear resistance.

Lubricants can be present in a photoreceptor layer. The outer layer can be any of the layers of the photoreceptor, such as, for example, the charge transport layer, overcoat layer, or other layer. The amount of liquid lubricant in the layer is, for example, from about 0.1 weight percent to 30 weight percent by the weight of the total solid contents, or from about 3 weight percent to about 20, or from 4 to about 10 weight percent based on the weight of the total solid contents of the layer.

In embodiments, the ratio in weight percentage of the binder, optional charge transport component (in the case of a charge transport layer), and the lubricant in the layer is from about 50/20/30 to about 49.5/49.5/1.

In embodiments, polyether lubricants are dispersed or dissolved in the binder in embodiments wherein the lubricant is present in the charge transport layer.

Polyether lubricants can be selected for the photoreceptor layer. In embodiments, polyether lubricants include polyphenyl ethers, polyphenyl thioethers C-ethers, and the like.

In embodiments, polyether lubricants include polyphenyl ethers, such as those with n+1 benzene rings linked by ether bonds. For example, "n" in the n+1 benzene ring would be from about 1 to about 10, or from about 3 to about 6. The generic structure of polyphenyl ether is:

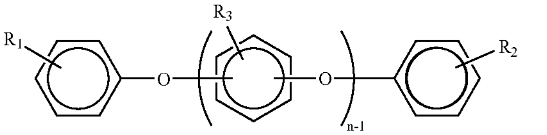

wherein $R_1$ $R_2$, and $R_3$ may be the same or different and are selected from H, and a straight or branched-chain alkyl having from about 1 to about 24 carbons, or from about 6 to about 20 carbons, or from about 8 to about 18 carbons. The hydrocarbon group may be bonded at any position of the aromatic ring. For example, "n" in the n+1 benzene ring would be from about 1 to about 10, or from about 3 to about 6.

Specific examples of polyphenyl ethers include m-diphenoxybenzene (m-3P2E), bis(m-phenoxyphenyl)ether (mm-4P3E), m-phenoxyphenyl p-phenoxyphenyl ether (mp-4P3E), m-phenoxyphenyl o-phenoxyphenyl ether (mo-4P3E), bis(p-phenoxyphenyl)ether (pp-4P3E), p-phenoxyphenyl o-phenoxyphenyl ether (p,o-4P3E), bis(o-phenoxyphenyl ether (oo-4P3E), bis(phenoxyphenyl)ether isomer mixture (mix-4P3E), m-phenoxyphenoxy m-biphenyl (mm-4P2E), m-bis(m-phenoxyphenoxy)benzene (mmm-5P4E), 1 -(m-phenoxyphenoxy)-3-(p-phenoxyphenoxy)benzene (mmp-5P4E), p-bis(m-phenoxyphenoxy)benzene (mpm-5P4E), 1-(m-phenoxyphenoxy)-4-(p-phenoxyphenoxy)benzene (mpp-5P4E), m-bis(p-phenoxyphenoxy)benzene (pmp-5P4E), p-bis(p-phenoxyphenoxy)benzene (ppp-5P4E), o-bis(m-phenoxyphenoxy)benzene (mom-5P4E), m-bis(o-phenoxyphenoxy)benzene (omo-5P4E), p-bis(o-phenoxyphenoxy)benzene (opo-5P4E), o-bis(o-phenoxyphenoxy)benzene (ooo-5P4E) and bis(phenoxyphenoxy) benzene isomer mixture (mix-5P4E) and bis (phenoxyphenoxyphenyl)ether isomer mixture (mix-6P5E), and the like.

In embodiments, polyether lubricants include polyphenyl thioethers, such as those with n+1 benzene rings linked by thioether bonds. For example, "n" in the n+1 benzene ring would be from about 1 to about 10, or from about 3 to about 6. The generic structure of polyphenyl thioether is:

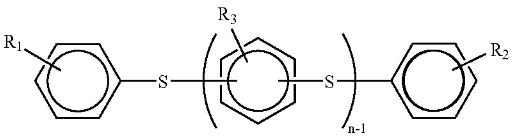

wherein $R_1$, $R_2$, and $R_3$ may be the same or different and are selected from H, and a straight or branched-chain alkyl having from about 1 to about 24 carbons, or from about 6 to about 20 carbons, or from about 8 to about 18 carbons. The hydrocarbon group may be bonded at any position of the aromatic ring. For example, "n" in the n+1 benzene ring would be from about 1 to about 10, or from about 3 to about 6.

Specific examples of polyphenyl ether include diphenyl thioether (2P1T), m-bis(phenylmercapto)benzene (m-3P2T), o-bis(phenylmercapto)benzene (o-3P2T), p-bis(phenylmercapto)benzene (p-3P2T), bis(phenylmercapto)benzene isomer mixture (mix-3P2T), bis(m-phenylmercaptophenyl)sulfide (mm-4P3T), bis(o-phenylmercaptophenyl)sulfide (oo-4P3T), bis(p-phenylmercaptophenyl)sulfide (pp-4P3T), m-phenylmercaptophenyl p-phenylmercaptophenyl sulfide (mp-4P3T), m-phenylmercaptophenyl o-phenylmercaptophenyl sulfide (mo-4P3T), p-phenylmercaptophenyl o-phenylmercaptophenyl sulfide (po4P3T), bis(mix-phenylmercaptophenyl)sulfide isomer mixture (mix-4P3T), m-bis(m-phenylmercaptophenylmercapto)benzene (mmm-5P4T) 1 -(m-phenylmercaptophenylmercapto)-3-(p-phenylmercaptophenylmercapto)benzene (mmp-5P4T), p-bis(m-phenylmercaptophenylmercapto)benzene (mpm-5P4T), 1-(m-phenylmercaptophenylmercapto)-4-(p-phenylmercaptophenylmercapto)benzene (mpp-5P4T), m-bis(p-phenylmercaptophenylmercapto)benzene (pmp-5P4T), p-bis(p-phenylmercaptophenylmercapto)benzene (ppp-5P4T), o-bis(m-phenylmercaptophenylmercapto)benzene (mom5P4T), m-bis(o-phenylmercaptophenylmercapto)benzene (omo-5P4T), p-bis(o-phenylmercaptophenylmercapto)benzene (opo-5P4T), o-bis(o-phenyl mercaptophenylmercapto)benzene (ooo-5P4T), mix-bis(phenylmercaptophenylmercapto) benzene isomer mixture (mix-5P4T) and the like.

Further, as specific examples of the polyphenyl thioether substituted with the hydrocarbon group, there can be mentioned mono-, di- or tri-alkylated polyphenyl thioether obtained by bonding from about 1 to about 3 alkyl groups of from about 6 to about 20 carbon atoms, or from about 10 to 17 carbon atoms. For example, there can be mentioned monoalkylated m-bis(phenylmercapto)benzene (R1-m-3P2T), dialkylated m-bis(phenylmercapto)benzene (R2-m-3P2T), trialkylated m-bis(phenylmercapto)benzene (R3-m-3P2T), as well as an alkylation product of bis(m-phenylmercaptophenyl)sulfide, m-bis(m-phenylmercaptophenylmercapto)benzene, and the like.

In embodiments, m-bis(phenylmercapto)benzene (m-3P2T), o-bis(phenylmercapto)benzene (o-3P2T), p-bis (phenylmercapto)benzene (p-3P2T), bis(m-phenylmercaptophenyl)sulfide (mm4P3T) or m-bis(m-phenylmercaptophenylmercapto)benzene (mmm-5P4T) can be used.

In embodiments, polyether lubricants include C-ethers, such as those with n+m+1 benzene rings wherein n is from about 1 to about 9, m is from about 1 to about 9, n+m is from about 1 to about 10, or from about 3 to about 6, and linked by a combination of thioether and ether bonds. The generic structure of C-ether is:

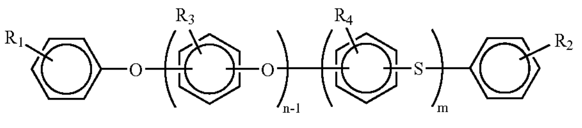

wherein $R_1$ $R_2$, $R_3$ and R4 may be the same or different and are selected from H, and a straight or branched-chain alkyl having from about 1 to about 24 carbons, or from about 6 to about 20 carbons, or from about 8 to about 18 carbons. The element n+m+1 benzene rings wherein n is from about 1 to about 9, m is from about 1 to about 9, n+m is from about 1 to about 10, or from about 3 to about 6

More specific examples include those C-ether lubricants having the following formulas:

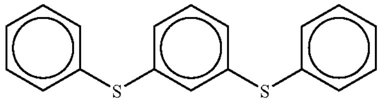

1,3-bis(phenylthio)benzene

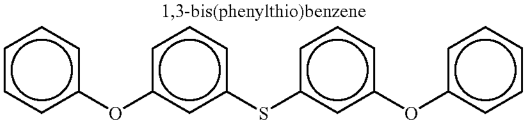

1,1-thiobis(3-phenoxybenzene)

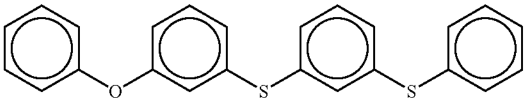

1-phenoxy-3-[[3-(phenylthio)phenyl]thio]benzene

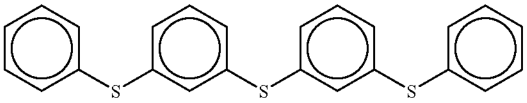

1,1-thiobis[3-(phenylthio)benzene]

The following Examples are being submitted to illustrate embodiments of the present disclosure. These Examples are intended to be illustrative only and are not intended to limit the scope of the present disclosure. Also, parts and percentages are by weight unless otherwise indicated. Comparative Examples and data are also provided.

EXAMPLES

Example 1

Preparation of Photoreceptor

Three multilayered photoreceptors of the rigid drum design were fabricated by conventional coating technology with an aluminum drum of 34 millimeters in diameter as the substrate. These three drum photoreceptors contained the same undercoat layer (UCL) and charge generating layer (CGL). The only difference is that Device I contained a charge transport layer (CTL) comprising a film forming polymer binder, a charge transport compound; Device II contained the same layers as Device I except that the polyphenyl ether Santovac OS-124 (five benzene rings linked by ether bonds with a pour point of 40° F. and a flash point of 550° F., available from Arch Technology Holding LLC, St. Charles, Mo. USA) was incorporated into the charge transport layer. Device III contained the same layers as Device I except that the polyphenyl thioether Santovac MCS-293 (four benzene rings linked by ether or thioether bonds with a pour point of −29° C. and a flash point of 445° F., available from Arch Technology Holding LLC, St. Charles, Mo., USA) was incorporated into the charge transport layer.

More specifically, a titanium oxide/phenolic resin dispersion was prepared by ball milling 15 grams of titanium dioxide (STR60N™, Sakai Company), 20 grams of the phenolic resin (VARCUM™29159, OxyChem Company, Mw of about 3,600, viscosity of about 200 cps) in 7.5 grams of 1-butanol and 7.5 grams of xylene with 120 grams of 1 millimeter diameter sized $ZrO_2$ beads for 5 days. Separately, a slurry of $SiO_2$ and a phenolic resin were prepared by adding 10 grams of $SiO_2$ (P100, Esprit) and 3 grams of the above phenolic resin into 19.5 grams of 1-butanol and 19.5 grams of xylene. The resulting titanium dioxide dispersion was filtered with a 20 micrometers pore size nylon cloth, and then the filtrate was measured with Horiba Capa 700 Particle Size Analyzer, and there was obtained a median $TiO_2$ particle size of 50 nanometers in diameter and a $TiO_2$ particle surface area of 30 m2/gram with reference to the above $TiO_2$/Varcum™ dispersion. Additional solvents of 5 grams of 1-butanol, and 5 grams of xylene; 5.4 grams of the above prepared $SiO_2$/Varcum™ slurry were added to 50 grams of the above resulting titanium dioxide/Varcum™ dispersion, referred to as the coating dispersion. Then an aluminum drum, cleaned with detergent and rinsed with deionized water, was dip coated with the above generated coating dispersion at a pull rate of 160 millimeters/minute, and subsequently, dried at 145° C. for 45 minutes, which resulted in an undercoat layer (UCL) deposited on the aluminum and comprised of $TiO_2$/$SiO_2$/Varcum™ with a weight ratio of about 60/10/40 and a thickness of 4 microns.

A 0.5 micron thick photogenerating layer was subsequently coated on top of the above generated undercoat layer from a dispersion of Type V hydroxygallium phthalocyanine (3.0 grams) and a vinyl chloride/vinyl acetate copolymer, VMCH (Mn=27,000, about 86 weight percent of vinyl chloride, about 13 weight percent of vinyl acetate and about 1 weight percent of maleic acid available from Dow Chemical (2 grams), in 95 grams of n-butyl acetate. Subsequently, a 26 μm thick charge transport layer (CTL) was coated on top of the photogenerating layer The CTL was dried at 120° C. for 40 minutes to provide the photoreceptor device. The preparation of the CTL dispersion was described as below.

Preparation of CTL solution for Device I: The CTL solution was prepared by dissolving N,N'-diphenyl-N,N-bis(3-methylphenyl)-1,1'-biphenyl-4,4'-diamine (5 grams) and a film forming polymer binder PCZ-400 [poly(4,4'-dihydroxy-diphenyl-1-1-cyclohexane, Mw=40,000)] available from Mitsubishi Gas Chemical Company, Ltd. (7.5 grams) in a solvent mixture of 20 grams of tetrahydrofuran (THF) and 6.7 grams of toluene.

Preparation of CTL solution for Device II: 0.625 grams of the polyphenyl ether Santovac OS-124 (five benzene rings linked by ether bonds with a pour point of 40° F. and a flash point of 550° F., available from Arch Technology Holding LLC, St. Charles, Mo. USA) was added into the same CTL solution for Device I. The final solution was allowed to mix for 8 hours before coating.

Preparation of CTL solution for Device III: 0.625 grams of the polyphenyl thioether Santovac MCS-293 (four benzene rings linked by ether or thioether bonds with a pour point of −29° C. and a flash point of 445° F., available from Arch Technology Holding LLC, St. Charles, Mo., USA) was added into the same CTL solution for Device I. The final solution was allowed to mix for 8 hours before coating.

Example 2

Testing of Photoreceptors

The above prepared three photoreceptor devices were tested in a scanner set to obtain photoinduced discharge cycles, sequenced at one charge-erase cycle followed by one charge-expose-erase cycle, wherein the light intensity was incrementally increased with cycling to produce a series of photoinduced discharge characteristic curves from which the photosensitivity and surface potentials at various exposure intensities were measured. Additional electrical characteristics were obtained by a series of charge-erase cycles with incrementing surface potential to generate several voltage versus charge density curves. The scanner was equipped with a scorotron set to a constant voltage charging at various surface potentials. The devices were tested at surface potentials of 500 and 700 volts with the exposure light intensity incrementally increased by means of regulating a series of neutral density filters; the exposure light source was a 780-nanometer light emitting diode. The aluminum drum was rotated at a speed of 55 revolutions per minute to produce a surface speed of 277 millimeters per second or a cycle time of 1.09 seconds. The xerographic simulation was completed in an environmentally controlled light tight chamber at ambient conditions (40 percent relative humidity and 22° C.). Three photoinduced discharge characteristic (PIDC) curves were obtained from the two different pre-exposed surface potentials, and the data was interpolated into PIDC curves at an initial surface potential of 700 volts. Incorporation of polyphenyl ether or polyphenyl thioether into charge transport layer did not appear to adversely affect the electrical properties of the imaging members.

Example 3

Wear Resistance Testing

Wear resistance tests of the above six devices were performed using a FX469 (Fuji Xerox) wear fixture. The total thickness of each device was measured via Permascope before each wear test was initiated. Then the devices were separately placed into the wear fixture for 50 kcycles. The total thickness was measured again, and the difference in thickness was used to calculate wear rate (nm/kcycle) of the device. The smaller the wear rate the more wear resistant is the imaging member. The wear rate data were summarized as follows in Table 1 below.

TABLE 1

| Device | Wear Rate (nm/kcycle) |
|---|---|
| I | 95 ± 1 |
| II | 71 ± 1 |
| III | 77 ± 1 |

Incorporation of polyphenyl ether or polyphenyl thioether into CTL improves wear resistance of the imaging member by about 10-30 percent when compared with the device with the CTL without the lubricant.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An imaging member comprising a) a substrate; and thereover b) a charge transport layer comprising a polyether lubricant selected from the group consisting of polyphenyl thioethers, C-ethers, polyphenyl ethers comprising n+1 benzene rings linked by ether bonds, and wherein said polyphenyl ether has the following formula:

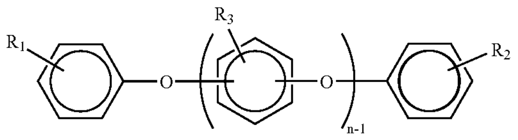

wherein $R_1$ $R_2$, and $R_3$ may be the same or different and are selected from the group consisting of hydrogen and an alkyl having from 1 to about 24 carbons, and n is from 1 to about 10, and mixtures thereof, and a charge transporting small molecule selected from the group consisting of 1-phenyl-3-(4'-diethylamino styryl)-5-(4"-diethylamino phenyl)pyrazoline, N,N'-diphenyl-N,N'-bis(3-methylphenyl)-(1,1'-biphenyl)-4,4'-diamine, N-phenyl-N-methyl-3-(9-ethyl)carbazyl hydrazone, 4-diethyl amino benzaldehyde-1,2-diphenyl hydrazone, 2,5-bis (4-N,N'-diethylaminophenyl)- 1,2,4-oxadiazole, N,N'-diphenyl-N,N'-bis(3-methylphenyl)-(1,1'-biphenyl)-4,4'-diamine, and mixtures thereof.

2. An imaging member in accordance with claim 1, wherein said polyphenyl ether is selected from the group consisting of m-diphenoxybenzene, bis(m-phenoxyphenyl) ether, m-phenoxyphenyl p-phenoxyphenyl ether, m-phenoxyphenyl o-phenoxyphenyl ether, bis(p-phenoxyphenyl)ether, p-phenoxyphenyl o-phenoxyphenyl ether, bis(o-phenoxyphenyl ether, bis(phenoxyphenyl)ether isomer mixture, m-phenoxyphenoxy m-biphenyl, m-bis(m-phenoxyphenoxy) benzene, 1 -(m-phenoxyphenoxy)-3-(p-phenoxyphenoxy)benzene, p-bis(m-phenoxyphenoxy)benzene, 1 -(m-phenoxyphenoxy)-4-(p-phenoxyphenoxy)benzene, m-bis(p-phenoxyphenoxy)benzene, p-bis(p-phenoxyphenoxy) benzene, o-bis(m-phenoxyphenoxy)benzene, m-bis(o-phenoxyphenoxy)benzene, p-bis(o-phenoxyphenoxy) benzene, o-bis(o-phenoxyphenoxy)benzene, bis (phenoxyphenoxy)benzene isomer mixture, bis (phenoxyphenoxyphenyl)ether isomer mixture, and mixtures thereof.

3. An imaging member in accordance with claim 1, wherein said polyphenyl thioether comprises n+1 benzene rings linked by thioether bonds, and wherein said polyphenyl thioether has the following formula:

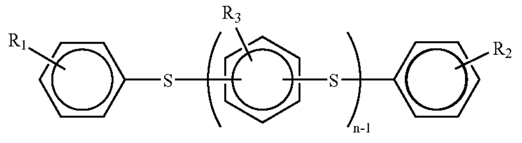

wherein $R_1$ $R_2$, and $R_3$ may be the same or different and are selected from the group consisting of hydrogen and an alkyl having from about to about 24 carbons, and n is from 1 to about 10.

4. An imaging member in accordance with claim 3, wherein said polyphenyl thioether is selected from the group consisting of m-bis(phenylmercapto)benzene, o-bis(phenylmercapto)benzene, p-bis(phenylmercapto)benzene, bis (m-phenylmercaptophenyl)sulfide, m-bis(m- phenylmercaptophenylmercapto)benzene, and mixtures thereof.

5. An imaging member in accordance with claim 1, wherein said C-ether has the formula:

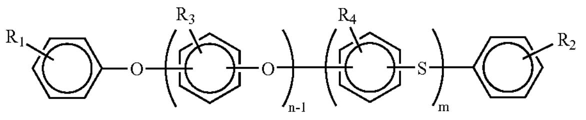

wherein $R_1$ $R_2$, and $R_3$ may be the same or different and are selected from the group consisting of hydrogen and an alkyl having from about 1 to about 24 carbons, and n and n+1 is from 1 to about 10.

6. An imaging member in accordance with claim 5, wherein said C-ether comprises n+m+1 benzene rings linked by a bond from a combination of ether and thioether bonds.

7. An imaging member in accordance with claim 5, wherein said C-ether is selected from the group consisting of 1,3-bis(phenylthio)benzene; 1,1-thiobis(3-phenoxybenzene); 1-phenoxy-3-[[3-(phenylthio)phenyl]thio] benzene; 1,1-thiobis[3-(phenylthio)benzene; and mixtures thereof.

8. An imaging member in accordance with claim 1, wherein said polyether is present in the outer layer in an amount of from about 0.1 to about 30 percent by weight of total solids.

9. An imaging member in accordance with claim 8, wherein said polyether is present in the outer layer in an amount of from about 3 to about 20 percent by weight of total solids.

10. An imaging member in accordance with claim 1, wherein said charge transport layer further comprises a binder.

11. An imaging member in accordance with claim 10, wherein said binder is selected from the group consisting of a polycarbonate, a polyarylate, an acrylate polymer, a vinyl polymer, a cellulose polymer, a polyester, a polysiloxane, a polyamide, a polyurethane, a poly (cyclo olefin), and an epoxy polymer.

12. An imaging member in accordance with claim 11, wherein said binder is a polycarbonate.

13. An image forming apparatus for forming images on a recording medium comprising:

a) an imaging member comprising a substrate; and thereover a charge transport layer comprising a polyether lubricant selected from the group consisting of polyphenyl thioethers, C-ethers, polyphenyl ethers comprising n+1 benzene rings linked by ether bonds, and wherein said polyphenyl ether has the following formula:

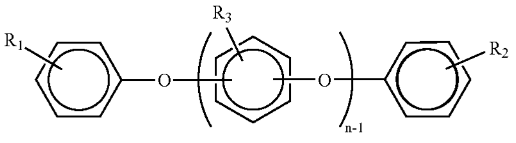

wherein $R_1$ $R_2$, and $R_3$ may be the same or different and are selected from the group consisting of hydrogen and an alkyl having from 1 to about 24 carbons, and n is from 1 to about 10, and mixtures thereof, and a charge transporting small molecule selected from the group consisting of 1-phenyl-3-(4'-diethylamino styryl)-5-(4"-diethylamino phenyl)pyrazoline, N,N'-diphenyl-N,N'-bis(3-methylphenyl)-(1,1'-biphenyl)-4, 4'-diamine, N-phenyl-N-methyl-3-(9-ethyl)carbazyl hydrazone, 4-diethyl amino benzaldehyde-1,2-diphenyl hydrazone, 2,5-bis (4-N,N'-diethylaminophenyl)- 1,2,4-oxadiazole, N,N'-diphenyl-N,N'-bis(3-methylphenyl)-(1,1'-biphenyl)-4,4'- diamine, and mixtures thereof;

b) a development component to apply a developer material to said charge-retentive surface to develop said electrostatic latent image to form a developed image on said charge-retentive surface;

c) a transfer component for transferring said developed image from said charge-retentive surface to another member or a copy substrate; and d) a fusing member to fuse said developed image to said copy substrate.

14. An imaging member comprising a) a substrate; and thereover b) an outer layer comprising a polyether lubricant selected from the group consisting of polyphenyl thioethers, C-ethers, polyphenyl ethers comprising n+1 benzene rings linked by ether bonds, and wherein said polyphenyl ether has the following formula:

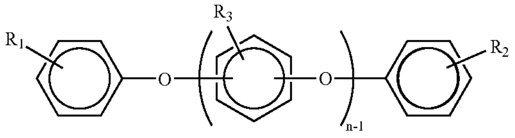

wherein $R_1$ $R_2$, and $R_3$ may be the same or different and are selected from the group consisting of hydrogen and an alkyl having from 1 to about 24 carbons, and n is from 1 to about 10, and mixtures thereof, and a charge transporting small molecule selected from the group consisting of 1-phenyl-3-(4'-diethylamino styryl)-5-(4"-diethylamino phenyl)pyrazoline, N,N'henyl-N,N'(3-methylphenyl)-(1,1'-biphenyl)-4,4'-diamine, N-phenyl-N-methyl-3-(9-ethyl)carbazyl hydrazone, 4-diethyl amino benzaldehyde-1,2-diphenyl hydrazone, 2,5-bis (4-N,N'-diethylaminophenyl)- 1,2,4-oxadiazole, N,N'-diphenyl-N,N'-bis(3-methylphenyl)-(1,1'-biphenyl)-4,4'-diamine, and mixtures thereof.

* * * * *